P. G. OWEN.
FENDER FOR MOVING VEHICLES.
APPLICATION FILED JAN. 21, 1915.

1,163,031.

Patented Dec. 7, 1915.
2 SHEETS—SHEET 1.

WITNESSES.
M. M. Capers
A. G. Sanford

INVENTOR.
PERCY GERALD OWEN.
BY Fetherstonhaugh Co.
ATT'YS.

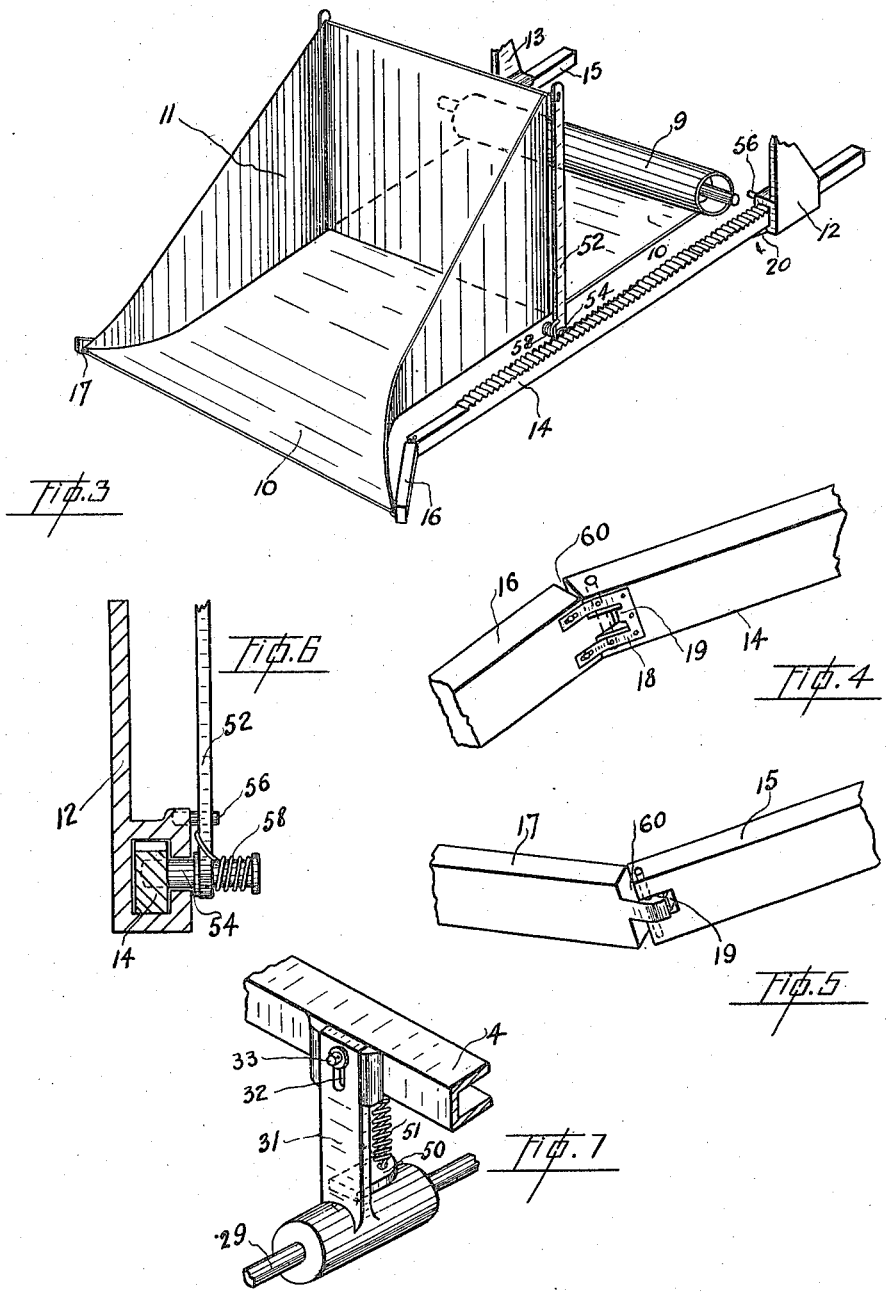

UNITED STATES PATENT OFFICE.

PERCY GERALD OWEN, OF VANCOUVER, BRITISH COLUMBIA, CANADA.

FENDER FOR MOVING VEHICLES.

1,163,031. Specification of Letters Patent. Patented Dec. 7, 1915.

Application filed January 21, 1915. Serial No. 3,525.

*To all whom it may concern:*

Be it known that I, PERCY GERALD OWEN, a subject of the King of Great Britain, and a resident of the city of Vancouver, in the Province of British Columbia, Canada, have invented certain new and useful Improvements in Fenders for Moving Vehicles, of which the following is a specification.

My invention relates to improvements in fenders for moving vehicles, with more particular reference to fenders for use with automobiles, street cars, and the like, and the object of my invention is to devise a fender of simple and comparatively inexpensive construction which is adapted to be carried normally under the fore part of the vehicle without projecting therefrom and to be quickly projected outwardly from the vehicle automatically and practically simultaneously with the striking of an object by the vehicle so as to catch and carry up the object, and which is further adapted to flare outwardly when extended so as to cover the path in front of the wheels and thus eliminate the possibility of the stricken and falling object rolling under the wheels while the vehicle is still moving. I attain this object by the means illustrated in the accompanying drawings in which—

Figure 1:
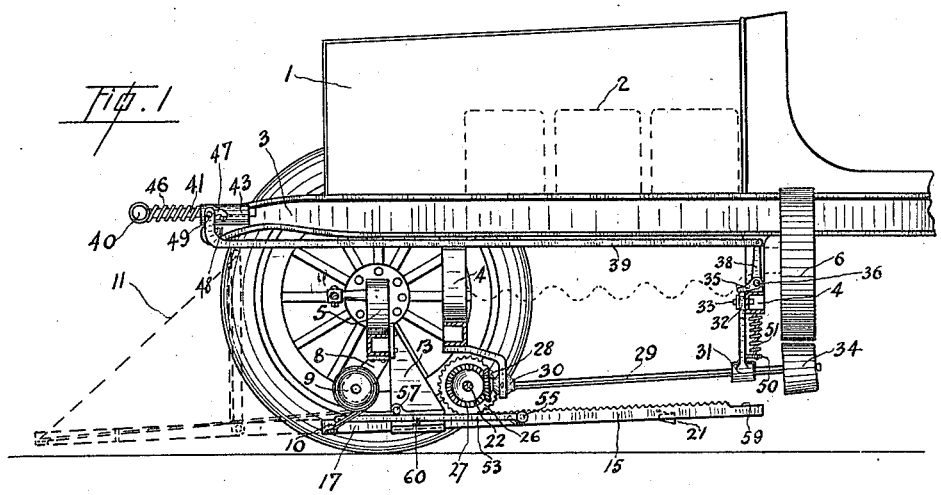
Figure 2:
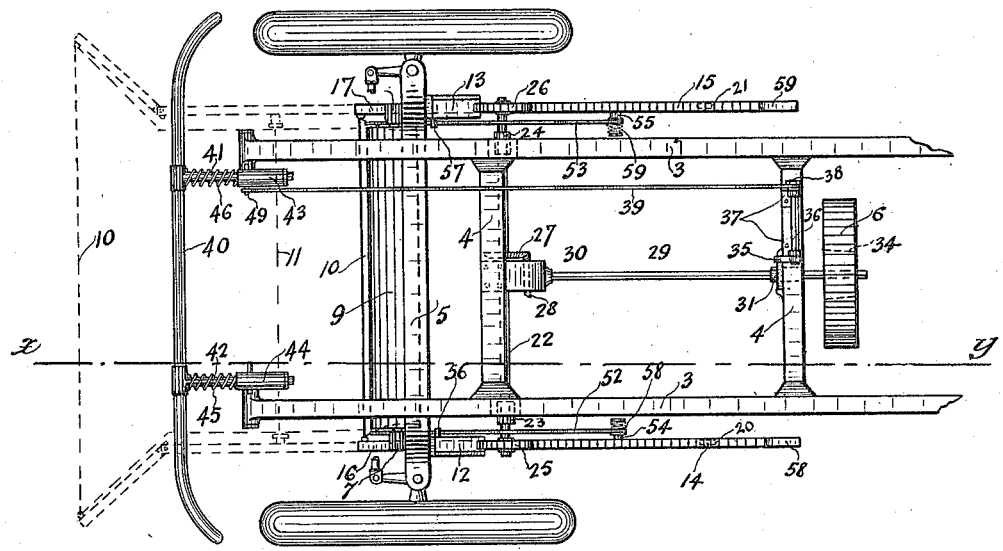

Figure 1 is a vertical section taken along the line x—y of Fig. 2 showing my device installed upon an automobile. Fig. 2 is a plan view of my device installed upon an automobile. Fig. 3 is a perspective view showing the fender extended and the receptacle open. Fig. 4 is a fragmentary view showing the knuckle joint of the rack. Fig. 5 is a view showing the extension portion locking means. Fig. 6 is a sectional detail view of the rack bracket. Fig. 7 is a perspective view showing the inner bearing for the longitudinal shaft.

Similar figures of reference indicate similar parts throughout the several views.

1 represents the hood of an automobile, inclosing the engine 2, shown dotted in Fig. 1.

3 represents the side channels of the chassis and 4 the cross connecting braces.

5 indicates the front axle.

6 is the engine fly wheel.

Secured to the front axle 5 are brackets 7 and 8 in which is rotatably mounted the spring roller 9, which roller is adapted to operate in the same manner as the spring rollers of window shades, the operation of which is too well known to need further description. Attached to the roller 9 and carried normally rolled up around same is a fabric member 10 of suitable material and of a length sufficient to extend well beyond the front wheels of the car, as shown dotted in Figs. 1 and 2, and which is flared outwardly on each side at its outer extremity so as to extend in front of the wheels, as shown in Figs. 2 and 3. Formed integrally with this fabric member 10 is a receptacle 11, which is adapted to fold flatly on the member 10 when same is being rolled up and to be opened out by a suitable means, as hereinafter described, when the fender is fully extended, as shown in Fig. 3.

It will be seen from the foregoing, therefore, that the operation of the roller 9 and fabric 10 is similar to that of the spring roller window shades in common use, that is, a pull on the extremity of fabric 10 will cause the roller 9 to rotate to unwind the fabric while the spring of the roller will operate to wind the fabric on to the roller again when the tension thereon is relieved.

12 and 13 indicate brackets secured to the front axle, or any other suitable part of the car, which brackets carry slidably the toothed racks 14 and 15, as shown in Figs. 1, 2, 3 and 6. These racks are provided respectively at their outer ends with extension portions 16 and 17 of the same cross section as the racks, to the ends of which is secured the outer extremity of the fabric member 10, as shown in Fig. 3, and which extension portions are hingedly connected to their respective racks 14 and 15 by knuckle joints, as shown at 60 in Figs. 1, 2, and particularly in Fig. 4, the position of the knuckle joints with relation to the length of their respective racks and extension portions being such that when the fender is in its normal position the respective knuckle joints will be within the brackets 12 and 13, as indicated dotted in Fig. 1.

Springs 18, as shown in Fig. 4, are provided in connection with each rack and its extension portion, adapted to break joint at the knuckle 60 as soon as the knuckle leaves the bracket when the fender is being projected forwardly and incline each extension portion outwardly, so that when the fender reaches the limit of its outward travel, the tightening of the fabric 10 will spread the extension portions 16 and 17 outwardly to the full extent, as shown in Fig. 3 and dotted in Fig. 2. In order to obviate the possibility of the extension portions 16 and 17 collapsing inwardly again when the weight of an object comes on the fabric when the fender is extended, should such weight be sufficient to overcome the springs 18, spring tongues, indicated by 19 in Figs. 4 and 5, are formed integrally with each spring 18, which tongues are bent to lie inside the jaw of their respective knuckle joints 60 so that the inner end or toe of the respective extension portions will bear on them, that is, the spring tongues, and hold them normally under compression when the fender is in its normal retracted position, from which it will be seen that when the extension portions are spreading outwardly their respective inner ends will pass beyond the ends of their respective spring tongues, which, being relieved from compression, will spring outwardly into place behind the ends of their respective extension portions, this action being designed to take place simultaneously with the completion of the outward movement of the fender, thus preventing inward movement of the extension portions 16 and 17 and possible sagging of the outer edge of the fabric member 10 until it is desired to roll the fabric member up again and return the fender to its normal position under the fore part of the car, it then being necessary to compress the spring tongues 19 by hand to allow of the extension portions being brought back to their normal position.

20 and 21 indicate spring stops which are compressed as the racks pass outwardly through their respective brackets 12 and 13 and which spring outwardly again after passing through the brackets so as to prevent backward movement of the racks when the fender is extended, as shown in Fig. 3.

22 indicates a transverse shaft rotatably carried in bearings 23 and 24 secured to the car frame, which shaft has secured thereon the gears 25 and 26, which gears normally engage the racks 14 and 15 respectively, as shown in Figs. 1 and 2. Shaft 22 has also secured thereon in a suitable position a bevel pinion 27, which meshes with a bevel pinion 28 secured to a longitudinal shaft 29, the forward end of which shaft is rotatably carried in a ball-and-socket bearing 30 secured to the car frame while its other end is carried by the bearing 31. Instead of this bearing 31, however, being rigidly secured to the car frame, it is provided with a slotted bolt hole 32 in its flange, as shown in Fig. 7, through which passes freely a pin 33, which pin slidably connects the bearing 31 to one of the car braces 4, as shown in Figs. 1 and 7, from which it will be seen that the bearing 31 is capable of limited upward and downward movement, the shaft 29 being permitted to move in accordance with the bearing 31 by the provision of the ball-and-socket bearing 30.

A friction pulley 34 is secured on the shaft 29, by means of which the shaft may be frictionally driven from the flywheel 6 of the engine. This pulley 34 is normally held out of engagement with the flywheel 6 by means of the lever 35, secured to a shaft 36, rotatably carried in bearings 37 secured to the car frame, and which lever normally bears against the upper edge of the flange of the bearing 31, as shown in Fig. 1, to keep the bearing in its lowest position so as to throw the pulley 34 clear of the rim of the flywheel 6. The lever 35 is itself held down against the upper edge of the flange of bearing 31 by means of a lever 38, secured to shaft 36, which lever 38 is connected by the rod 39 to the cross bar 40 found in most automobiles. The cross bar 40, however, instead of being rigidly secured to the frame as at the present time, is provided with the tubular members 41 and 42, by means of which it is slidably mounted in bearings 43 and 44, which bearings are securely fastened to the extremities of the side channels 3, the insertion of the springs 45 and 46 between the cross bar 40 and the bearings 43 and 44, as shown in Figs. 1 and 2, keeping the cross bar in its outermost position and at the same time holding lever 35 against the bearing 31 to keep the pulley 34 clear of the flywheel 6. A slot 47 having a stop 48 formed at its inner end is provided in the side of bearing 43, through which slot extends a pin 49 secured into the tubular member 41 and to which pin the outer end of rod 39 is attached, as shown in Fig. 1.

Extending between a lug 50 on the bearing 31 and a suitable part of the car frame is a spring 51, which is in tension when the bearing is in its lowest position and the pulley 34 free of the flywheel, so that it will pull the bearing upwardly when the lever 35 is moved from contact with the flange of the bearing 31 and thus draw the pulley 34 into frictional engagement with the flywheel.

For the purpose of opening out the receptacle 11 as the fender is projected outwardly, levers 52 and 53 are provided. These levers are swingably mounted at their lower ends on pins 54 and 55, which pins are secured into their respective racks 14 and 15, and the brackets 12 and 13 are slotted on one side, as shown in Figs. 1 and 6, to permit of the passage of the pins 54 and 55 as the racks are moved inwardly or outwardly. Pins 56 and 57 are secured into the brackets 12 and 13 to bear on the top edges of the levers 52 and 53, as shown in Figs. 1 and 2, to fold same downwardly when the racks are being moved inwardly, while the pins 54 and 55 are extended, as shown in Figs. 2 and 6, and on the extended portions are mounted coil springs 58 and 59 respectively, which act on the levers 52 and 53 respectively and cause same to spring upwardly when clear of the pins 56 and 57 when the fender is being projected outwardly. As the top edge of the back portion of the receptacle 11 is connected to the upper extremities of the levers 52 and 53, it will be seen that, referring particularly to Fig. 3, the receptacle is opened out when the levers rise to the vertical position and that it closes when the levers fold into position as shown in Fig. 1.

Having thus indicated the principal parts of my invention I will now describe briefly the manner in which it operates. The fender is normally carried under the fore part of the car, as shown in Figs. 1 and 2, the cross bar 40 being then in its outermost position. When an object is struck by the cross bar, the impact drives the bar inwardly to be locked in its inmost position by the pin 49 which engages behind the stop 48 at the inner end of slot 47. This inward movement of the cross bar 40 moves the rod 39 to actuate the lever 38, which moves shaft 36 to raise lever 35 from the top edge of the flange of bearing 31, which is immediately drawn upwardly by spring 51, thus bringing pulley 34 into frictional engagement with the rim of the revolving flywheel 6 to rotate shaft 29, which, by means of the bevel pinions 27 and 28, rotates the shaft 22, causing the gears 25 and 26 to move their respective racks 14 and 15 outwardly until the racks come to the end of their outward travel, the length of which is determined by the provision of plain portions 58 and 59 at the inner ends of the racks, as shown in Fig. 1, and also by the length of the fabric member 10. This fabric member being attached to the ends of the extension portions 16 and 17, it will be seen that the movement of the racks outwardly exerts a pull on the outer extremity of the fabric member, causing it to unwind and at the same time rotate the roller 9, so that when the racks are extended at full length outwardly, the fabric member 10 will be stretched therebetween, extending well beyond the car wheels, and flared out with the receptacle opened in the manner already described. When it is necessary to put the fender back to its normal position, the cross bar 40 is pulled out to its outermost position again after disengaging the pin 49 from the stop 48, thus depressing the bearing 31 to throw pulley 34 clear of the flywheel, the springs 19 are compressed to allow the extension portions 16 and 17 to come into line with their respective racks, and the stops 20 and 21 are compressed to allow the racks to be slid inwardly, after which the entire device may be moved into its normal retracted position again, the spring of roller 9 causing the roller to rotate as the tension thereon is relieved and wind the fabric member on to the roller again, the receptacle 11 folding on to the fabric member at the same time in the manner already described.

Although the foregoing description is made with reference to an automobile, it will be seen that it is equally applicable, with modifications to suit the conditions, to other moving vehicles such as street cars and the like, and it is intended, therefore, that all matter contained therein shall be interpreted as illustrative and not in a limiting sense.

What I claim as my invention is:

1. In a fender for moving vehicles, a roller extending across and under the forepart of the vehicle, a fabric member wound around said roller, a normally folded receptacle carried by said fabric member, means for automatically extending the said fabric member to a point in front of the vehicle, and means for opening out the receptacle as the fabric member extends.

2. In a fender for moving vehicles, a roller extending across and under the forepart of the vehicle, a fabric member wound around said roller and provided with a normally closed receptacle adapted to wind around said roller when closed, means for automatically extending the fabric member to a point in front of the vehicle, and means for automatically opening out the said receptacle as the fabric member extends, said means being adapted to automatically close the said receptacle as the fabric member is re-wound on said roller.

3. A fender for moving vehicles, comprising a normally rolled up fabric member extending transversely across and under the forepart of the vehicle, a normally closed receptacle carried by the said fabric member and adapted to roll up with the same, normally stationary mechanism adapted to be automatically set in motion by and simultaneously with the impact of the forepart of the vehicle on an object in the way thereof to un-roll the said fabric member so as to catch and carry up the object, and means for automatically opening out the said receptacle to receive the object simultaneously with the extension of the said fabric member.

4. In a fender for moving vehicles, a spring roller extending across and under the forepart of the vehicle, a fabric member normally wound up around said roller, a pair of toothed racks slidably carried by the vehicle frame and to the outermost extremities of which the free end of the said fabric member is attached, said racks being mounted for longitudinal outward and inward movement, mechanism adapted to be operated by the propelling mechanism of the vehicle when engaged therewith for projecting said racks outwardly, means for holding said mechanism normally free of the said propelling mechanism, and means operated by the impact of the moving vehicle on an object in way thereof for releasing the said holding means so as to allow the rack mechanism to be driven by the said propelling mechanism.

5. In a fender for moving vehicles, a spring roller extending across and under the forepart of the vehicle, a fabric member normally wound up around the said roller, and flared outwardly at its free end so as to spread when extending in front of the wheels of the vehicle, a pair of racks slidably carried by the vehicle frame and mounted for longitudinal outward and inward movement, an extension portion for each rack hingedly connected to the outer end thereof and to each of which the flared end of the said fabric member is attached, said extension portions being adapted to break joint outwardly so as to spread the flared end of the fabric member when same is extended, normally stationary mechanism adapted to project said racks outwardly when set in motion, and means operated by the impact of the moving vehicle on an object in the way thereof for causing said stationary mechanism to be brought into frictional engagement with the propelling mechanism of the vehicle to be set in motion thereby and project the said racks and said fabric member outwardly.

6. A fender for moving vehicles, comprising a normally rolled up fabric member carried by the vehicle and extending transversely across and under the forepart thereof, a normally stationary mechanism for automatically un-rolling the said fabric member to extend in front of the vehicle, said mechanism being adapted to be set in motion automatically by the propelling mechanism of the vehicle and simultaneously with the impact of the outermost forward part of the vehicle on an object in the way thereof to unroll the said fabric member a predetermined distance, and means for then preventing inward movement of the said fabric member.

7. A fender for moving vehicles, comprising a normally rolled up fabric member carried by the vehicle and extending transversely across and under the forepart thereof, the free end of said member being flared outwardly so as to spread when extended in front of the wheels of the vehicle, a pair of racks slidably carried by the vehicle frame and mounted for longitudinal outward and inward movement, an extension portion for each rack hingedly connected to the outer end thereof and to each of which the flared end of the fabric member is attached, said extension portions being adapted to break joint outwardly so as to spread the flared end of the said fabric member when same is extended, means for projecting the said racks outwardly to extend said fabric member, and means for locking the extension portions in the spread position.

Dated at Vancouver, B. C., this 29th day of December, 1914.

PERCY GERALD OWEN.

Witnesses:
 JOHN DOWNIE,
 JENNIE OWEN.

Copies of this patent may be obtained for five cents each, by addressing the "Commissioner of Patents, Washington, D. C."